Figure 3:
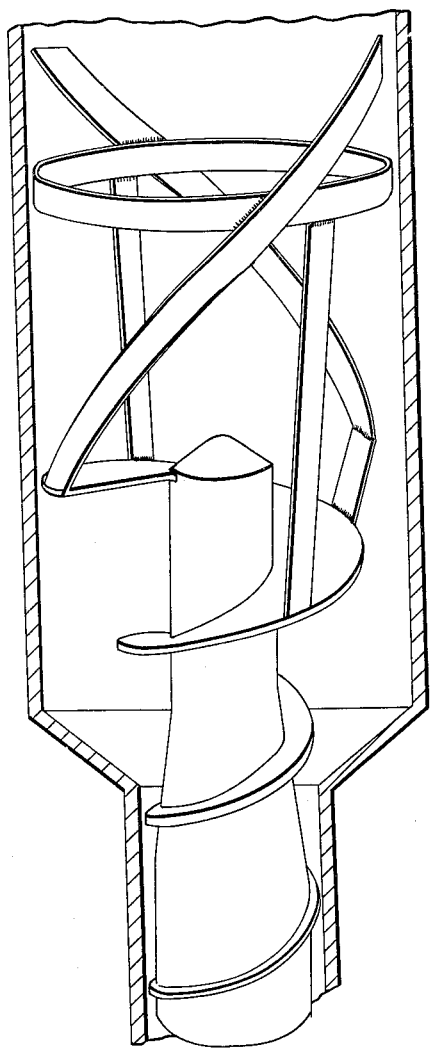

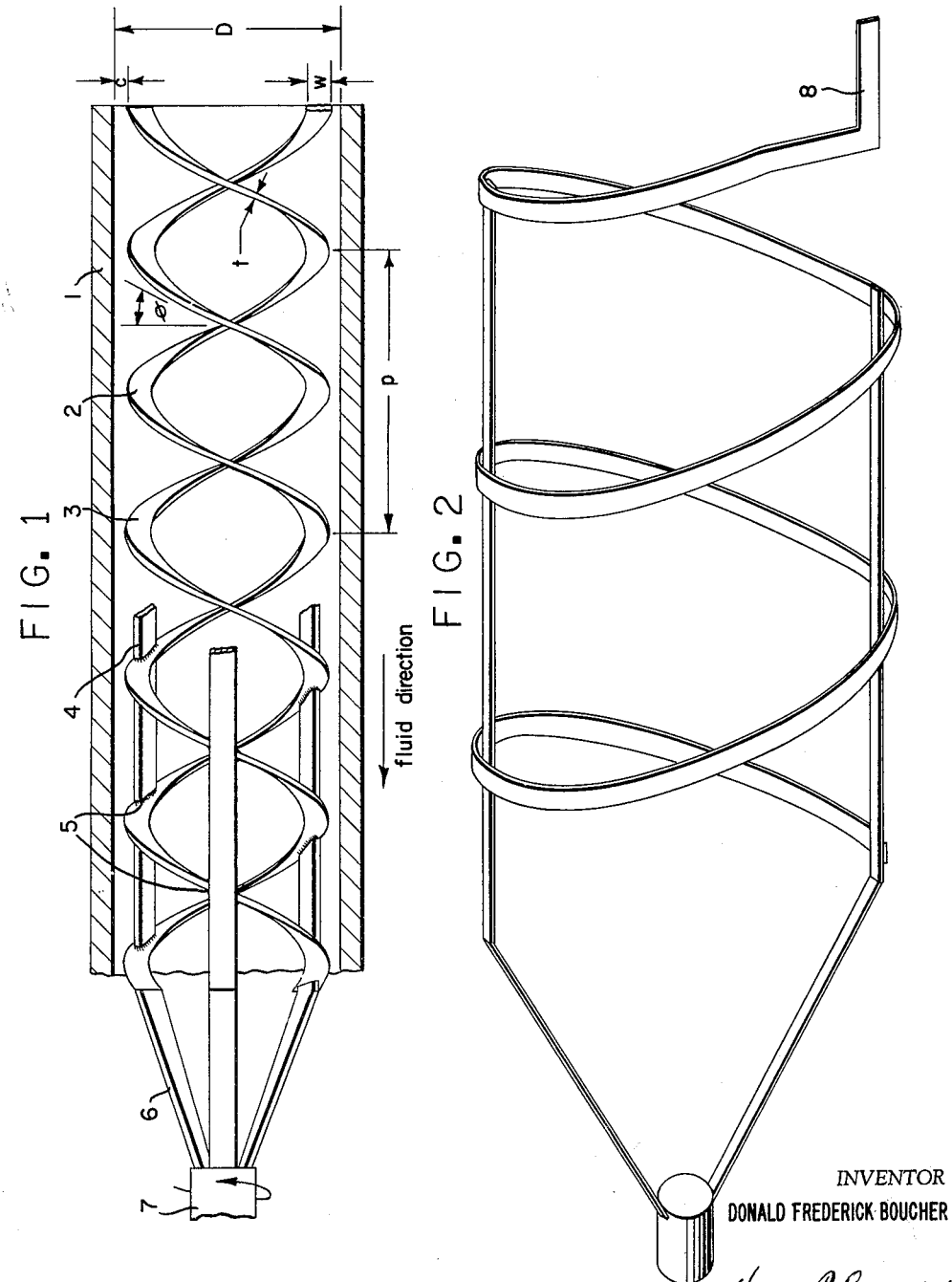

INVENTOR
DONALD FREDERICK BOUCHER

3,087,435
PUMPING PROCESS
Donald Frederick Boucher, New Castle, Del., assignor to E. I. du Pont de Nemours and Company, Wilmington, Del., a corporation of Delaware
Filed Mar. 31, 1961, Ser. No. 99,804
5 Claims. (Cl. 103—89)

This invention concerns the handling of viscous liquids especially those that are thermally unstable, such as those which are likely to change in composition, molecular weight or physical properties on heating.

An objective in handling such viscous polymerizable liquids is to obtain uniform treatment of all parts of the material handled, which means usually that every part should pass through the treatment zone with the same time of residence as every other part. Any part which resides longer may polymerize to a higher degree and will accordingly have different physical properties than those parts which resided a shorter time. This lack of uniformity is generally undesirable.

Under some special circumstances, it may be desired that a given material be a uniformly mixed composite mass made up of parts that have resided in the treatment zone for time intervals covering the whole gamut of possible times, which in a well-stirred vessel theoretically could range from zero to infinity. More often, however, there is a particular time of polymerization which produces the best balance of properties. If it is possible to control this time within narrow limits, the product quality is enhanced. Properties which are affected by degree of polymerization, and consequently will be improved by better control of time of residence, include uniformity of dyeability, light fastness, oxidation resistance, transparency, haze, tensile strength, Young's modulus, and, also, more intangible properties, such as "handle" of textile products made of the polymers.

It is an important object of this invention to provide apparatus, for combination with conduits or vessels, that may be used to maintain the plug-flow, i.e. substantially uniform liquid flow velocities of all of the viscous liquid in a given transverse cross section of such conduits or vessels, where, under prior art conditions, the material adjacent to the conduit or vessel wall would have lagged behind the main stream of liquid and resided much longer in the vessel or line.

It is another object of this invention to provide apparatus that will insure that a flowing viscous liquid will move through a conduit or vessel with minimum backmixing either at the center or at the walls.

It is a further object of this invention to provide apparatus that will have a minimum of solid surfaces in the regions of low shear stress, thereby to avoid sites for stagnation.

It is a further object of this invention to provide an improved method for the handling of viscous liquids, wherein plug-flow of the viscous liquid and of relative freedom from decomposition can be attained.

Other advantages and objectives will appear from a consideration of the following specification and claims together with the accompanying drawings in which:

FIGURE 1 shows a preferred embodiment of this invention in which a section of a helical ribbon cagelike conveyor is shown in its conduit or vessel wall with the clearance between the conveyor and wall exaggerated for clarity and its dimensions labeled.

Figure 4:
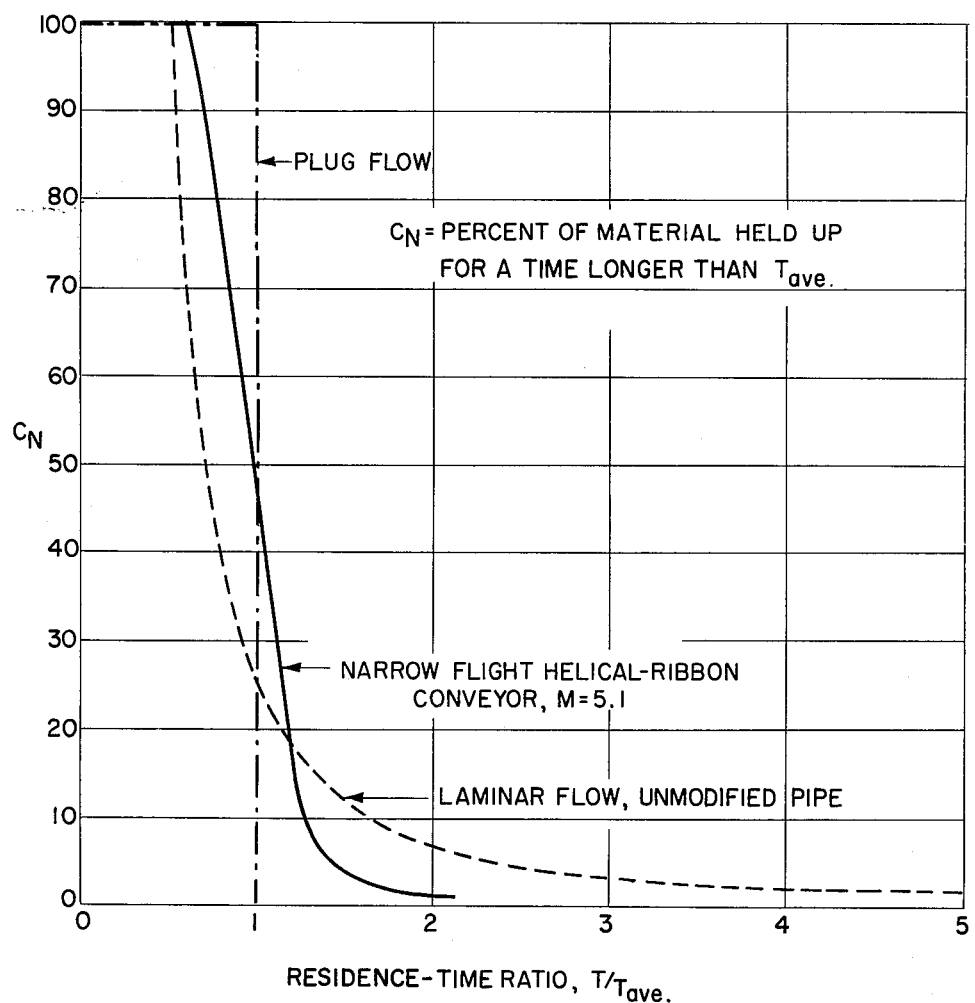
Figure 5:
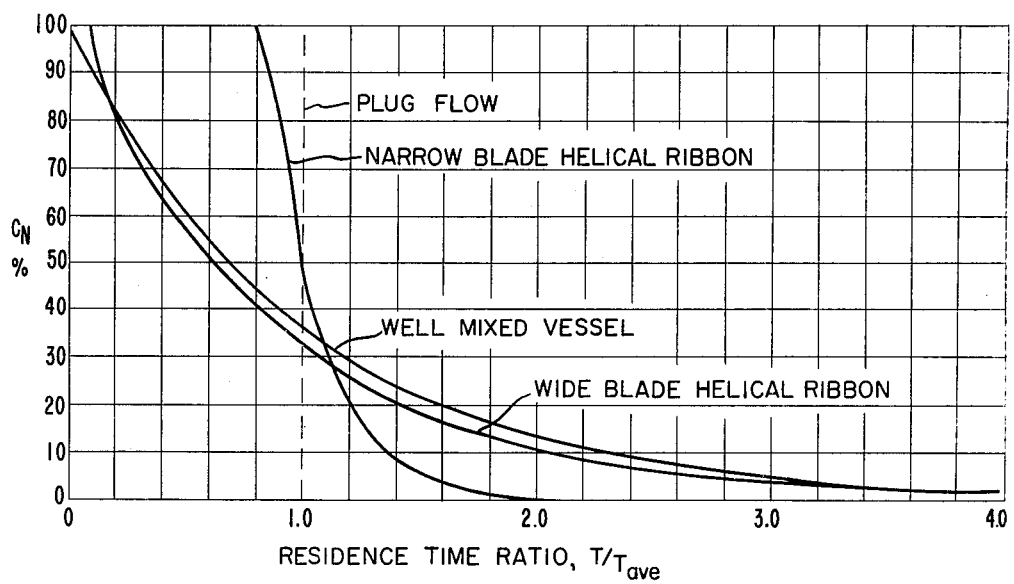

FIGURE 2 shows another embodiment of this invention in which the helical ribbon conveyor is of a flat-wound type rather than the edge-wound type, FIGURE 3 shows a short dual flight flat-wound type helical ribbon conveyor which is attached to the end of a screw pump, FIGURE 4 is a graphical comparison of actual performance of a particular embodiment of the invention with theoretical performance, FIGURE 5 shows further comparison of actual performance with theoretical performance.

In the preferred embodiment of the invention (FIGURE 1), a narrow ribbon member 2 is wound into a helical shape, having a diameter closely fitting into a cylindrical structure 1 which forms a vessel or conduit through which the viscous liquid to be processed is passed under pressure produced by a pumping means or by the force of gravity. The helical ribbon member 2 is supported and rotated within the cylinder structure 1 by a plurality of generally parallel bars 4 that form a cylindrical array concentric with and parallel to the axis of the cylindrical structure 1, and of diameter such that the bars 4 fit closely within the cylinder structure 1. The bars 4 and the helical ribbon member 2 together form a cagelike structure, which is fixed to and supported by, at at least one end, a rotating shaft means 6, 7 coaxial with the cylinder structure. In operation, the helical ribbon cage is rotated in close clearance with the wall of the cylinder to shear, and by the helical ribbon members pitch, to provide an additional propelling force for the viscous liquid near the cylinder structure wall, axially along the length of the cylinder structure. The direction and speed of rotation are related, by a relationship disclosed in detail, to the geometry of the system and the flow-rate of the viscous liquid, so that the liquid in the outermost portions of the liquid stream near the cylindrical wall moves with an axial velocity component approximately equal to the area average flow velocity, whereby essentially plug-flow or substantially uniform velocity exists throughout the liquid in a given transverse cross section of the cylinder.

At first inspection, it might appear that plug-flow of the conduit or vessel contents would be obtained by creation of a general pressure differential and, in addition, rotating the helical ribbon member at a speed such that the liquid adjacent to its surface would be propelled longitudinally at the plug-flow velocity. However, it is found that the situation is complicated by the presence of the circumferential component of velocity of the helical ribbon, and by slip along the propelling surface of the ribbon. It appears that the liquid just inside the vessel walls is pressed into a helical path like a barber pole, as it passes along the length of the vessel, and probably induces a similar rotation upon the liquid in the core.

Our work indicates that the longitudinal component of velocity of the liquid produced by the helical flight is related to the geometry of the helical ribbon, and may best be expressed by the formula $$N = M\left(\frac{V_p}{\pi W D^3}\right)$$

where $N$ = helical ribbon rotation speed, r.p.m.
$M$ = factor to be described below
$V$ = volumetric liquid flow rate, cu. ft./(min.)
$p$ = helical ribbon pitch, the longitudinal advance for one full revolution of a particular flight, feet
$\pi = 3.14$
$W$ = width of the helical flight ribbon radially, feet
$D$ = inside diameter of the vessel, feet In the above expression, certain simplifications have been made in order to increase the practical value. It is assumed that the clearance, C, between the outside diameter of the flights and the inside of the vessel is a very small fraction of the diameter, D, a fraction of the order of 0.01 or less. This assumption is based on the necessity to have the flight rotate close to the vessel wall in order to shear away the liquid adjacent to the wall, minimizing to the greatest possible extent the volume of liquid not transferred by "plug-flow."

It is also assumed that the width, W, of the ribbon is small relative to the diameter, preferably 0.2 or less. This limitation is desirable in order that all parts of the conveyor may be in the region of highest shear in the vessel, to prevent formation of gel on the parts of the conveyor that might be in low shear central zones of the vessel. It is also desirable that the flights be narrow in order that the conveyor will achieve its basic purpose of promoting plug-flow and not act as a mere mixing device.

In the case of multiple flights on the same conveyor, the pitch, $p$, is equal to the longitudinal spacing of corresponding points on the adjacent flights multiplied by the number of flights. The benefit of multiple flights as compared with single flights of the same pitch is that the number of shearings or scrapings of any particular point on the vessel wall is increased by the number of flights.

The factor, $M$, is a dimensionless number derived by experimental studies; its value is in the range of unity to about 5.4, and preferably should be given a value of 5.0. This factor establishes the best speed of rotation for a given geometry of vessel and conveyor, and a given liquid flow rate. At higher rotation speeds, the conveyor begins to act more as a mixer, advancing the outer layers faster than the core of the moving liquid. At lower speeds or rates, the moving material along the wall is being additionally propelled only at a resultant rate which is intermediate between the average rate and the low wall-rate that would have prevailed with no conveyor present.

In the following detailed discussion reference is again made to FIGURE 1. The numeral 1 designates the cross-section of the cylindrical vessel; for example a section of pipeline in which is inserted the helical conveyor, which is to be described in some detail. The flights of this conveyor are designated 2, and, in the particular embodiment, is shown as a double flight version, but it will be realized that the actual number of flights is not important. In this embodiment, the flights are wound in edgewise fashion, that is so that the longer dimension of the cross section of the flight extends radially in the vessel. The vessel has a cylinder diameter "D," and the flight has a slightly smaller diameter equal to the cylinder diameter "D," less twice the clearance "C."

The radial width of the flights is designated "W," and the thickness of the cross section of the flight ribbon is designated "$t$." The flight pitch is designated "$p$," and is the distance from one point on the flight to the corresponding point on the next complete turn of the same flight. In this diagram, the second flight of the two flights is designated 3. In this figure the cagelike longitudinal supporting bars are designated 4. For clarity in description, these bars are omitted in part of the unit. In this instance, three such bars are shown, but the exact number and their dimensions will be determined by mechanical considerations concerned primarily with the power required to convey and shear the liquid under concern, and to provide sufficient stiffness to the helical array. The mechanical details concerned with the dimensions of these bars are not a part of this invention. The bars will be located along the outer diameter of the conveyor where they will provide the desired amount of stiffness to the cage.

In the drawings, it is indicated that the bars and the helices are attached to one another by welding techniques at points designated by reference numeral 5, but it will be realized that there are other satisfactory means for this construction. At the lower part of the diagram, it is shown that the bars 4 are connected to bars 6 which converge from the outer diameter to a smaller diameter at the end of a shaft 7 to which these bars are attached. This shaft 7 is coaxial with the helical cage and the cylindrical vessel, and, by rotation of the shaft in the direction indicated by the arrow, the helix is similarly rotated and exerts a propelling force in the diagram in the direction indicated by the arrow labeled "fluid direction," which propelling force supplements the general primary force in the liquid exerted by a pumping means or by gravity.

The system from which the pipeline or vessel receives its supply of fluid, and the pumping means, have not been shown, since they form no part of the present invention. Likewise, the receiving system, which in most cases would be attached to the lower end, has not been shown, it having no function in the description of this invention. In some circumstances, it would be possible and desirable to rotate the shaft in the opposite direction from that shown and thereby propel the fluid at the periphery of the pipeline from the bottom of the drawing to the top. It will also be possible, in some situations, to arrange the shaft to be inserted from the top rather than from the bottom as shown, but the circumstances which are involved in these choices are unimportant in describing this invention.

In the preferred embodiments of the invention, however, the core along the central regions of the pipeline is preferably not occupied by any solid parts such as spokes, struts, or supports, because, as previously indicated, this core ribbon would be in a region of low shear, such that polymerization or gel formation might occur with undesirable results. The dimensions for the flights in this conveyor will be selected to fit any particular situation by the design method previously described relating the flow rate, rotation rate, helix width, and pitch to one another.

FIGURE 2 shows another embodiment in which the helical ribbon was wound flatwise rather than edgewise, as in FIGURE 1. The helix diameter is approximately 5 inches, and its length approximately 12 inches. It is made out of metallic ribbon about ⅜-inch wide and ¹⁄₁₆-inch thick, but, since it is wound flatwise, the width dimension referred to in the earlier terminology would be the ¹⁄₁₆-inch dimension, and the thickness dimension previously referred to would be the ⅜-inch dimension. The pitch of this unit is approximately 5 inches, and it will be noted that only a single flight is used; also, that only two longitudinal supporting bars are used. The supporting bars are attached to two extensions from the shaft shown at the bottom part of the view.

This embodiment of the helical conveyor is especially useful in a partially filled polymerization vessel to act upon the outer portions of the gravity motivated liquid stream to an extent sufficient to move the material near the wall of the vertical-axis vessel at the same rate as the material at the center, thereby obtaining plug-flow. In this particular arrangement, the liquid level may advantageously be located at approximately the upper end of the helical flight. When the liquid level is much above the top of the flight, it is apparent that the advantage of plug flow is not obtained in that portion of the vessel. Alternatively, of course, there will usually be no disadvantage in operating the scraper with some of the flights exposed above the liquid level.

In another embodiment of the invention, used when the liquid level came approximately at the upper end of the helical flight, the flight was prolonged upwardly in a short plow-like extension shown at 8. This extension served to scrape the liquid from the wall immediately above the interface, thereby avoiding long residence of material spattered from the inlet line (not shown) onto the wall above the interface. The flat-wound ribbon was desirable for this conveyor in order to permit a relatively high rotational velocity without impelling too much of the liquid longitudinally in the vessel; thereby effective plug-flow was secured.

FIGURE 3 shows a short section of a helical conveyor consisting of two flights, each of approximately one-half turn arranged at the upper end of a screw pump and supported by two longitudinal bars, with the addition of a cylindrical ring which served as intermediate support to stiffen the conveyor in the absence of a complete turn on either of the flights. In this particular case, the rate of rotation was determined by the pumping rate necessary on the screw pump forming the lower part of this unit, and it was therefore necessary to select the dimensions of the conveyor after having fixed this rate of rotation.

FIGURE 4 is a comparison of an experimentally determined residence-time distribution for a narrow-flight helical-ribbon conveyor in the operation of which the factor shown in the previous equation was 5.1. Also shown on this chart are two calculated times of residence, one of which would be that for plug-flow of the liquid (the ideal), and the other of which would be that for theoretical laminar flow in a smooth unmodified pipe of the same character as that in which the helical-ribbon conveyor was operated. This chart has the residence time ratio as the abscissa and a concentration function as the ordinate. The unity value on the abscissa corresponds to the time at which a material flowing in plug-flow fashion would emerge from the pipeline. The other values are the ratios of actual times to this plug-flow time. The concentration function on the ordinate represents the precent of a material which originally entered the pipeline in uniform distribution across the flow front that still remains in the pipeline at any time shown by the abscissa.

In this comparison, by definition, all of the material that would be flowing in plug-flow fashion would have left at the time ratio indicated by unity on the abscissa and therefore the plug-flow curve of operation is a step function dropping vertically from 100 to zero at the abscissa value=1.

In the laminar flow case, the distribution of velocities across the cross section is parabolic, and it can be calculated by straightforward mathematical techniques based upon such a parabolic distribution that a component entering in uniform distribution across the pipeline cross section will drop in concentration according to the curve shown for laminar flow. According to this curve, 100% of the material would still be present at half the plug-flow time (0.5 on the abscissa), 25% of it would still be present at the ordinate of one, 6% of it would be present at twice the plug-flow time, and 1% of it would still be present at 5 times the plug-flow time.

The experimental line shown on this curve for the helical-ribbon conveyor of this invention shows a very great improvement over the laminar flow situation approaching surprisingly closely to the desired plug flow. In this case, the concentration begins to drop sharply at about 9/10 of the plug-flow time, crosses the plug-flow time at approximately 45%, and drops down rapidly so that only 1% of the material remains in the system at twice the plug-flow time.

FIGURE 5 shows further comparison of the narrow-blade helical ribbon of this invention with other methods often used to transport viscous liquids. The ordinate and abscissa on this figure are the same as those on the previous figure. The plug-flow relation is the same as previously described, and the narrow-blade helical conveyor is essentially the same as previously described, this particular one being slightly more efficient in its operation, in that all of the material remained in the vessel up until 9/10 of the plug-flow time and then suddenly started leaving and dropping rapidly so that at twice the plug-flow time only 1% remained.

Also shown, is the calculated curve for the out-flow from a well-mixed vessel wherein the out-flow begins at zero time; 36% of the material remains at the plug-flow time and 1% of the material still remains at four times the plug-flow time.

The final curve on this graph shows the performance of a wide-blade helical ribbon, and it will be observed that the line follows very close to that representing the well-mixed vessel. This curve indicates clearly that a wide-blade helical ribbon is not effective in promoting plug-flow but rather is a good mixer. The advantages obtained by the present invention are not obtained by using such wide-blade mixers.

The apparatus of this invention is highly useful for handling any high viscosity liquid in a manner to avoid laminar flow. It is especially suitable for the handling of such materials at high temperatures. Especially suitable liquids are the thermoplastic polymers, such as polystyrene, polyvinyl chloride, polyvinylidene chloride, cellulose acetate/butyrate, polyamides, polyesters, polyethers, polyoxymethylene, polyethylene, polypropylene, and the like, as well as copolymers, graft copolymers, and polymer mixtures of these and others. High viscosity polymer solutions are also included, as well as sucrose solutions, high viscosity petroleum, fractions, resins, varnishes and the like.

Although variations and modifications will be apparent to those skilled in the art, it is intended that the scope of the invention be limited only by the following claims.

I claim:

1. An improved method of uniformly moving a mass of highly viscous liquid in plug flow from a first position to a spaced second position in a closed conduit, said conduit provided with an inner surface, said method comprising the steps of introducing a mass of highly viscous liquid into the conduit, creating a pressure drop in the conduit across said two positions sufficient to move at least a portion of the liquid in said conduit from said first to said second position so that said liquid in the center portion of the conduit moves at a higher veloctiy than said liquid in outer portions adjacent the inner surface of the conduit due to frictional forces, and maintaining the liquid in the center portion of the conduit in undisturbed flow condition while applying a sufficient impelling force only to said outer portions of the liquid adjacent the inner surface of the conduit substantially in the general direction of liquid movement in the conduit to produce sufficient increased liquid flow in said portions such that the velocity of the flowing liquid in said conduit is substantially constant throughout any given transverse cross-sectional zone of said liquid.

2. An improved method of moving a mass of highly viscous liquid in plug flow in a closed conduit from a first to a second position, said conduit provided with an inner surface and said liquid mass consists of an inner central portion and an outer surrounding portion adjacent the conduit inner surface, said method comprising the steps of maintaining the inner central portion of the liquid in undisturbed flow while applying a sufficient impelling force to said outer portion only of said liquid mass, said impelling force having a substantial component along the general direction in which the conduit extends, said component being of a sufficient magnitude to produce uniform flow of the liquid in said conduit such that the velocity of the liquid in said inner central portion is substantially equal to the velocity of the liquid in said outer portion.

3. An improved process for moving a highly viscous liquid in plug flow from one position to another longitudinally spaced position in a closed conduit, said conduit provided with a rotatable narrow helical ribbon member mounted coaxially with the axis of said conduit and in close proximity to the inner surface of said conduit, said process comprising the steps of creating a pressure drop in the conduit across said two positions sufficient to produce a force to move at least a portion of the liquid in said conduit from said one position to said longitudinally spaced position so that the liquid in the central portion of the conduit moves in undisturbed flow at a higher velocity than the liquid in the surrounding outer portion adjacent the inner surface of the conduit, and creating an additional sufficient impelling force solely in said outer portions of said liquid adjacent the inner surface of the conduit in the direction of liquid movement by rotation of said helical ribbon member at a speed such that the velocity of the liquid moving in the conduit is substantially constant throughout any given transverse cross-sectional plane in said liquid.

4. The improved process of claim 3 in which the relationship of the speed of rotation of the helical member to the other characteristics of the system is generally indicated by the following expression $$N = M\left(\frac{V_p}{\pi W D^3}\right)$$

in which $N$ = helical ribbon member rotational speed in r.p.m.
$M$ = a factor or dimensionless member having a value of from about 1 to 5.4 for a given viscous liquid and given system geometry
$V$ = volumetric liquid flow rate in cubic feet per minute
$p$ = helical ribbon member pitch in feet
$\pi$ = 3.14
$W$ = width of helical ribbon member in feet
and $D$ = inside diameter of the conduit in feet 5. The improved process of claim 4 in which the factor $M$ has a value of about 5.0.

References Cited in the file of this patent

UNITED STATES PATENTS

| | | |
|---|---|---|
| 455,384 | Birkholz | July 7, 1891 |
| 649,065 | Martens | May 8, 1900 |
| 1,359,048 | Fridell | Nov. 16, 1920 |
| 2,699,870 | Leeman | Jan. 18, 1955 |
| 2,896,253 | Moe | July 28, 1959 |
| 2,920,347 | Joukainen et al. | Jan. 12, 1960 |

FOREIGN PATENTS

| | | |
|---|---|---|
| 229 | Great Britain | July 21, 1904 |
| 389,793 | Germany | Feb. 7, 1924 |
| 666,036 | France | May 14, 1929 |
| 1,184,766 | France | Feb. 9, 1959 |